United States Patent [19]

Antonov et al.

[11] 4,352,033
[45] Sep. 28, 1982

[54] CONTACTLESS SUPERCONDUCTING SYNCHRONOUS ELECTRICAL MACHINE

[76] Inventors: Jury F. Antonov, prospekt Stachek, 83, kv. 12; Igor A. Glebov, prospekt Smirnova, 24, korpus 3, kv. 52; Valentin N. Shakhtarin, prospekt Metallistov, 14, kv. 6, all of Leningrad, U.S.S.R.

[21] Appl. No.: 171,177

[22] Filed: Jul. 22, 1980

[51] Int. Cl.³ .............................................. H02K 9/19
[52] U.S. Cl. ...................................................... 310/52
[58] Field of Search ...................... 310/10, 40, 52, 54, 310/61, 165

[56] References Cited

U.S. PATENT DOCUMENTS

| | | | |
|---|---|---|---|
| 3,471,726 | 10/1969 | Burnier et al. | 310/10 X |
| 3,648,082 | 3/1972 | MacNab et al. | 310/10 |
| 3,657,580 | 4/1972 | Doyle | 310/10 X |
| 3,940,643 | 2/1976 | Sika et al. | 310/165 X |
| 3,942,053 | 3/1976 | Abolins et al. | 310/10 X |
| 4,058,746 | 11/1977 | Mole et al. | 310/52 X |
| 4,079,273 | 3/1978 | Lambrecht et al. | 310/52 |
| 4,155,019 | 5/1979 | Weghaupt | 310/165 X |
| 4,176,292 | 11/1979 | Kalsi et al. | 310/52 |

Primary Examiner—Donovan F. Duggan
Attorney, Agent, or Firm—Lilling & Greenspan

[57] ABSTRACT

A contactless superconducting synchronous electrical machine comprises a rotor affixed to a rotatable shaft and provided with a superconducting field winding, the superconducting field winding being positioned within a cryostat; an annular stator located in concentrical relation with the rotor; and an exciter for the superconducting field winding provided with an inductor and a superconducting armature winding, the superconducting armature winding being positioned within the cryostat, affixed to the shaft and electrically connected to the superconducting field winding. The superconducting armature winding is implemented in the form of a cylindrical sheating affixed to a cylindrical surface of an annular former which is rigidly fixed to the shaft in concentrical relation therewith. The inductor comprises an immovable annular core with a multiphase winding, positioned in concentrical relation with the armature winding, and also comprises at least one magnetizing superconducting annular coil affixed to the shaft in axial relation to the former, in the vicinity of an end face thereof, and positioned within the cryostat. That portion of the vacuum shell of the cryostat which is within the gap between the annular core and the armature winding is made of dielectric material.

1 Claim, 1 Drawing Figure

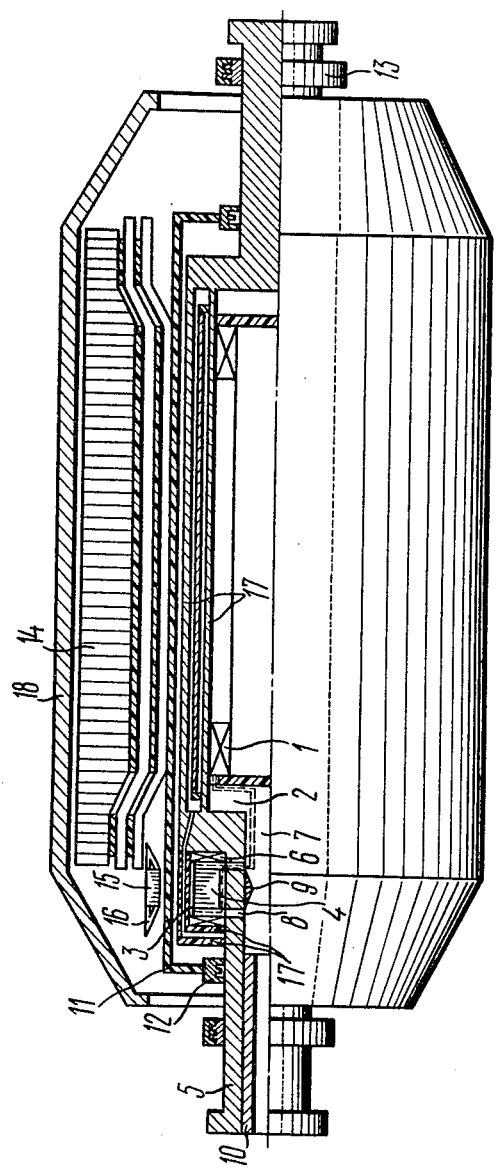

CONTACTLESS SUPERCONDUCTING SYNCHRONOUS ELECTRICAL MACHINE

BACKGROUND OF THE INVENTION

1. Field of the Invention

The invention relates to electrical machines, and, more particularly, to contactless superconducting synchronous electrical machines used as synchronous generators and synchronous compensating devices.

2. Description of the Prior Art

Known in the art is a superconducting synchronous electrical machine which is a synchronous generator comprising a superconducting field winding cooled with helium at 4° to 5° K. (cf. the FRG patent application No. 2,028,158, cl. 21d$_2$-1 as published for opposition, 1971). The described machine also comprises a stator having a winding of non-superconducting material, a rotor implemented as a cryostat mounted on a shaft and accommodating the superconducting field winding, a means adapted to supply the cryostat with the coolant, bearings in which the shaft provided with vacuum-tight packings is rotatably mounted, a stationary dielectric casing surrounding the rotatable cryostat, and a contact means having a system of power leads through which the current from a stationary exciter is fed to the field winding.

Proper excitation of the described machine is attained by the use of internally stabilized superconducting winding materials which possess higher current-carrying capability in the presence of magnetic fields of great induction. As a result, the contact means with a system of power leads and the stationary exciter feature complex design and the machine has poor reliability and inadequate power characteristics.

There is a contactless superconducting synchronous electrical machine in which a superconducting field winding takes power from a superconducting exciter working as a magnetic flux pump (cf. the FRG patent application No. 1,488,730, cl.21d$_1$-51 as published for opposition, 1969).

The machine has an annular stator and a rotor with a superconducting field winding, fixed on rotatable shaft in a concentrical relation to the stator. The superconducting field winding is mounted in a main cryostat and is coupled to a superconducting armature winding of the exciter made of a thin sheet in the form of a disc and positioned in an additional cryostat, on the end face portion of the rotor shaft. The inductor of the exciter is rotated by an electric motor which is set in coaxial relation to the rotor shaft. The coolant is led to and withdrawn from the cryostat by virtue of a radially located coolant supply assembly. The rotatable shaft is set in stand-mounted bearings and the bearings on the exciter side is installed between the main and the additional cryostats.

In the described machine the availability of the electric motor for the exciter inductor makes it impossible to utilize an axially positioned coolant supply assembly which has the simplest design and operational features. As a result, the machine becomes complex and its reliability is poor. Moreover, greater design complexity is due to the fact that no stand-mounted bearing can be installed on the exciter side, in the vicinity of the end face of the shaft. Therefore, two cryostats, main and additional, must be used, with the result that it is impossible to install a single stationary dielectric casing surrounding the movable parts of the machine. In this casing, a vacuum is created and heat loss due to the rotation of the movable parts is thus reduced.

SUMMARY OF THE INVENTION

An object of the invention is to provide a contactless superconducting synchronous electrical machine offering higher efficiency and reliability, void of an electric motor for driving the exciter inductor and utilizing a simple-to-operate axially positioned coolant supply assembly.

Another object of the invention is to provide bearings located near the end faces of the rotor shaft, and a common cryostat for all superconducting elements of the machine.

There is provided a contactless superconducting synchronous electrical machine comprising a rotor affixed to a rotatable shaft and provided with a superconducting field winding, the superconducting field winding being positioned within a cryostat; an annular stator located in concentrical relation with the rotor; and an exciter for the superconducting field winding provided with an inductor and a superconducting armature winding, the superconducting armature winding being positioned within the cryostat, affixed to the shaft and electrically coupled to the superconducting field winding. According to the invention, the superconducting armature winding is implemented in the form of a cylindrical sheating affixed to a cylindrical surface of an annular former, which is rigidly fixed to the shaft in concentrical relation therewith. The inductor is implemented in the form of an immovable annular core, which is provided with a multiphase winding and is positioned in a concentrical relation with the superconducting armature winding. At least one superconducting magnetizing annular coil is rigidly mounted on the shaft in axial relation with the former, in the vicinity of an end face thereof, and is positioned within the cryostat having a portion of its vacuum shell, which is within a gap between the annular core and the superconducting armature winding, made of dielectric material.

The machine of the invention does not require an electric motor for the exciter inductor since the exciter inductor is an immovable annular core with a multiphase winding producing a bipolar running magnetic field. The exciter inductor, set in concentrical relation with the superconducting armature winding, also comprises at least one superconducting magnetizing annular coil which produces a unipolar magnetic field and is fixed on the shaft in axial relation to a cylindrical former carrying the superconducting armature winding. As a result, it is possible to install an axially positioned coolant supply assembly. In addition, stand-mounted bearings can be installed in the end face portions of the rotor shaft and all the superconducting elements of the machine can be accommodated within a single cryostat surrounded by a common dielectric hermetically sealed casing.

BRIEF DESCRIPTION OF THE DRAWING

The invention will now be described in more detail, by way of example, with reference to the accompanying drawing which illustrates a longitudinal section of a contactless superconducting synchronous electrical machine, according to the invention.

DETAILED DESCRIPTION OF THE INVENTION

The machine of the invention comprises a superconducting field winding 1. The field winding 1 is positioned within the inner chamber of a cryostat 2, filled with a coolant (liquid helium), and is electrically coupled (for example, by means of contact welding) to a superconducting armature winding 3 of an exciter. In the drawing, connecting superconductors are shown in dashed line. The superconducting armature winding is in the form of a cylindrical sheating. It may be made, for example, of a sheet of niobium foil having a cylindrical shape, of may be in the form of individual superconducting threads arranged to form a hollow cylinder. The winding 3 is set on a cylindrical surface of an annular former 4 which is rigidly fixed to a rotatable shaft 5. To reduce its magnetic resistance, the former 4 is implemented as a stack of electrical sheet steel. The shaft 5 carries two superconducting magnetizing coils 6 located near the end faces of the former 4. There are a plurality of axial ducts 7 and radial ducts 8 within the shaft 5 through which the coolant is passed. In the shaft 5 there is also a differential flow regulator means 9 adapted to regulate the flow rate of the coolant passing through parallel ducts 7 and 8. The coolant is led in and withdrawn from the cryostat 2 by means of a coolant supply assembly 10 (shown in the drawing is an outlet pipe connected with the system). The superconducting magnetizing coils 6 are rigidly fixed to the shaft 5 and cooled down with the coolant passing through the radial ducts 8. The superconducting field winding 1 is cooled by the coolant fed from the supply assembly 10 through the axial duct 7. There is a stationary dielectric casing 11 and vacuum-tight (for example, magnetic-fluid) seals 12 connect the casing 11 to the shaft 5. The shaft 5 is rotatably mounted in bearings 13 set near its end face portions within the "warm" zone (outside the cryostat 2).

The shaft 5, in conjunction with the winding 1 and the cryostat 2, constitutes the rotor of the machine of the invention. An annular stator 14 is located within the "warm" zone in axial relation with the rotor. There is a stationary annular core 15 with a multiphase winding 16, in a concentrical relation with the winding 3. The core 15 is in the "warm" zone and is implemented as a pack of electrical sheet steel in order to reduce its magnetic resistance. Vacuum shells 17 of the cryostat 2 are made of a dielectric material at that portion of the cryostat which is overlapped by the former 4, namely, within the gap between the core 15 and the winding 3. To reduce the magnetic leakage flux referred to the stator 14, there is an electromagnetic shield 18.

The machine of the invention operates in the following manner. The rotor shaft 5 is rotated by a drive means, for example, a steam turbine (not shown). Under the action of the coolant supply assembly 10, the coolant is fed through the axial supply and withdrawal ducts 7 into the area of location of the superconducting field winding 1, and through the radial supply and withdrawal ducts 8 into the area of location of the superconducting armature winding 3 and the superconducting magnetizing coils 6. When the multi-phase winding 16 is energized by a stationary a.c. source (not shown), a magnetic field is created which rotates at a frequency $f_1$ within the gap between the core 15 and the former 4. If a maximal amplitude of the magnetic induction of that rotating field exceeds the magnetic induction $B_{C2}$ of the upper critical field of the material of the superconducting armature winding 3, there result 2p normal zones (where p is the number of pole pairs of the multiphase winding 16) in the winding 3, said zones having the destroyed superconducting states resulted from the rotating magnetic field. As a result, the magnetic flux passes through the superconducting armature winding 3 and is driven in contact with the core 15 through the former 4. Before starting the machine, the superconducting magnetizing coils 6 take power from a stationary power supply (not shown) and are then shunted by a superconducting jumper (not shown). As a result, the coils 16 are maintained in a short-circuited state (the "frozen" flow mode) during the rotation of the shaft 5. The coils 6 produce a unipolar magnetic field across the superconducting armature winding 3. The variable and the unipolar magnetic fields are summed to form across the superconducting armature winding 3 an asymmetrical magnetic field. In the asymmetrical magnetic field, the amplitude of the induction belonging to one polarity is considerably greater than the amplitude of the induction of the opposite polarity and exceeds the value of $B_{C2}$. As a result, p normal zones are established in the winding 3. When the shaft 5 rotates at frequency $f_2$ differing from frequency $f_1$, the superconducting armature winding 3 rotates together with the shaft. If the magnetic field produced by the multiphase winding 16 rotates at frequency $f_1$ in a direction coinciding with that of the shaft 5, then the normal zones equal in number to p, in the winding 3, rotate at frequency $f = f_2 - f_1$. The relative rotation of the winding 3 at f within the magnetic field described above causes an electromotive force of a value approximately equal to $p \cdot f \cdot \phi_0$ to be induced in the closed superconducting excitation circuit of the machine, where $\phi_0$ is the magnetic flux passing through each of p normal zones. In the excitation mode, the magnetic flux is "pumped" into the superconducting field winding 1 and is "pumped" out of it in the no-excitation mode. To change the direction of the magnetic flux, the direction of rotation of the magnetic field established by the multiphase winding 16 is reversed by phase switching. The excitation rate of the machine can be adjusted by changing the frequency or amplitude of the current flowing through the winding 16.

What is claimed is:

1. A contactless superconducting synchronous electrical machine comprising: a rotatable shaft; a superconducting excitation winding affixed to said rotatable shaft; an annular former affixed to said shaft in coaxial relation with said superconducting excitation winding; a superconducting armature winding implemented in the form of a cylindrical sheating and affixed to a cylindrical surface of said annular former; at least one magnetizing superconducting annular coil affixed to said shaft in axial relation with said former, in the vicinity of an end face of said former; a cryostat affixed to said shaft and surrounding said superconducting field winding, said annual former, said armature winding, and the magnetizing coil; said cryostat with said elements surrounded by said cryostat constituting a rotor of said machine; an annular stator located in axial relation with said rotor; a stationary annular core installed in concentrical relation with said armature winding; a multiphase winding on said annular core; said cryostat having a portion of a vacuum shell, within a gap between the annular core and the superconducting armature winding, made of dielectric material.

* * * * *